United States Patent [19]

Smith

[11] Patent Number: 5,952,966

[45] Date of Patent: Sep. 14, 1999

[54] ANTENNA ASSEMBLY

[75] Inventor: Martin Stevens Smith, Chelmsford, United Kingdom

[73] Assignee: Northern Telecom Limited, Montreal, Canada

[21] Appl. No.: 08/927,977

[22] Filed: Sep. 11, 1997

[30] Foreign Application Priority Data

Jul. 23, 1997 [GB] United Kingdom .................... 9715478

[51] Int. Cl.⁶ ...................................................... H01Q 3/26
[52] U.S. Cl. ............................ 342/373; 342/359; 342/367
[58] Field of Search ..................................... 342/359, 373, 342/367, 425

[56] References Cited

U.S. PATENT DOCUMENTS 5,128,687  7/1992  Fay .

FOREIGN PATENT DOCUMENTS

WO 96/17486  6/1996  WIPO .

OTHER PUBLICATIONS

Flat–plate steerable antennas for satellite communications and broadcast reception by M C D Maddocks and M S Smith.

Primary Examiner—Thomas H. Tarcza
Assistant Examiner—Dao L. Phan
Attorney, Agent, or Firm—Lee, Mann, Smith, McWilliams, Sweeney & Ohlson

[57] ABSTRACT

A communications antenna assembly is disclosed, suitable for use in fixed antenna multiple access systems, such as fixed wireless access schemes and satellite communication systems. Such systems have independent base station transmitters which, in the case of fixed wireless access schemes, may be subject to over capacity and/or obstructions between the subscriber and the base station and, in the case of non-geostationary satellite communication systems continuously move. The antenna is operable to communicate with at least one of two communication stations at each of two directions from the antenna assembly, said assembly comprising: a beamformer connected to the antenna and arranged to allow the antenna to provide at least two antenna beams, one substantially in each of the communication station directions are provided substantially simultaneously, such that in use the antenna assembly can communicate with the two communication stations. A corresponding system and method of use is also described.

20 Claims, 8 Drawing Sheets

ANTENNA ASSEMBLY

FIELD OF THE INVENTION

This invention relates to radio communication systems and in particular relates to an antenna assembly which is suitable for use in fixed antenna multiple access systems

BACKGROUND TO THE INVENTION

Fixed wireless access systems are currently employed for local telecommunication networks, such as the IONICA system. Known systems comprise an antenna and decoding means which are located within a subscriber's premises, for instance adjacent a telephone. The antenna receives the signal and provides a further signal by wire to a decoding means. Thus subscribers are connected to a telecommunications network by a radio link in place of the more traditional method of copper cable. Such fixed wireless access systems will be capable of delivering a wide range of access services from POTS (public operator telephone service), ISDN (integrated services digital network) to broadband data. The radio transceivers at the subscribers premises communicate with a base station, which provides cellular coverage over, for example, a 5 km radius in urban environments. A typical base station will support 500–2000 subscribers. Each base station is connected to a standard PSTN switch via a conventional transmission link/network.

When a fixed wireless access telecommunications system is originally deployed, then a base station of a particular capacity will be installed to cover a particular area. The capabilities of the base station will be commensurate with the anticipated coverage and capacity requirement. Subscribers antennas will be mounted outside, for instance on a chimney and upon installation will be directed towards the nearest base station or repeater antenna (any future reference to a base station shall be taken to include a repeater). In order to meet the capacity demand, within an available frequency band allocation, fixed wireless access systems divide a geographic area to be covered into cells. At the centre of each cell is a base station through which the subscribers stations communicate; the distance between the cells being determined such that co-channel interference is maintained at a tolerable level. When the antenna on the subscriber premises is installed, an optimal direction for the antenna is identified using monitoring equipment. The antenna is then mounted so that it is positioned towards the optimal direction. The antenna is then fixed in this position and can only be moved by reinstalling it.

A potential problem with this type of directed, fixed antenna is that the "optimal direction" for the antenna may change over time. For example, if the antenna is installed during the winter, summer foliage may later obscure the antenna. Obstacles in a signal path, such as buildings in built-up areas and hills in rural areas, act as signal scatterers and can cause signalling problems. These scattered signals interact and their resultant signal at a receiving antenna is subject to deep and rapid fading and the signal envelope often follows a Rayleigh distribution over short distances, especially in heavily cluttered regions. Since the various components arrive from different directions, there is also a Doppler spread in the received spectrum. Correct alignment and installation of a fixed wireless access subscriber terminal towards a geographically proximate base station is essential for the correct performance of the network.

Another possibility is that the position of the nearest base station may change, for example, as more base stations are installed when the number of subscribers increases. In the situation that the subscriber would like to receive signals from different base stations at different times (for example, from two different geo stationary satellites), then the subscriber would need to change the direction of the antenna. This can be done by manually moving the antenna, or installing two antennas, although both these options are inconvenient and time consuming.

A further problem concerns situations when the subscriber would like to communicate, with non geo-stationary satellites. For example, with low earth orbiting LEO or medium earth orbiting MEO satellite systems, where the satellite direction changes with time and fast "hand over" between satellites is required in order to provide an uninterrupted service. This could be achieved using two antennas, each mechanically steered. However, this is expensive and it is often more unsightly to site two antennas on a building rather than just one. For the purposes of this application, the term "fixed" should not be understood as being a limitation upon the direction of the antenna. A similar situation could exist in a satellite communications environment when, for example, one might wish to watch a television programme provided by one satellite whilst videoing a programme from another satellite. This is not possible using a single directed fixed antenna (with a single aperture) as is typically used in such systems. In order to receive signals from two different directions simultaneously, the subscriber would need to install two antennas which increases the costs involved.

U.S. patent application Ser. No. 08/758,989, in the name of Northern Telecom Ltd, describes a system which allows a single directional antenna beam to be aligned for one direction. The specification describes an antenna assembly for a fixed wireless access system, where the antenna direction is adjustable using a motorised, mechanical positioning system. However, this type of system can be expensive to manufacture and install. Further, in a LEO or MEO environment, handover would not be seamless.

Maddocks and Smith describe a system for allowing a single antenna beam to be aligned for one direction in their paper, "Flat-plate steerable antennas for satellite communications and broadcast reception" IEE Proceedings H, Vol. 138, No. 2, April 1991. This describes a flat plate antenna assembly that is designed to be mounted flush on a wall. The antenna assembly can be mechanically rotated in the plane of the assembly as one degree of freedom. A Rotman lens beamformer is provided to provide the antenna beam with a second degree of freedom. However, this system only allows a single beam to be aligned for one direction. Also, a polarisation converter must be used which adds to the cost and bulk of the antenna assembly.

OBJECT OF THE INVENTION

The present invention seeks to provide an antenna assembly suitable for use with fixed wireless access systems which overcomes or at least mitigates one or more of the problems noted above. Not only should the antenna design allow manufacturing costs to be kept down, but the design should also be low profile. That is, the antenna should be as small and lightweight as possible and should be designed to blend in with its environment.

SUMMARY OF THE INVENTION

According to a first aspect of the present invention there is provided a communications antenna assembly operable to communicate with at least one of two communication stations at each of two directions from the antenna assembly, said assembly comprising:

(i) an antenna oriented in use such that a plane of scan of the antenna includes the two directions;

(ii) a beamformer connected to the antenna and arranged to allow the antenna to provide at least two antenna beams, one substantially in each of the communication station directions, and wherein the antenna beams are provided substantially simultaneously, such that in use the antenna assembly can communicate with the two communication stations.

A corresponding method of operating a communications antenna assembly to communicate with at least one of two communication stations at each of two directions from the antenna assembly, said method comprising the steps of:

(i) orientating an antenna included in the antenna assembly such that in use, a plane of scan of the antenna includes the two directions; and (ii) providing at least two antenna beams, one substantially in each of the base station directions, and providing said beams substantially simultaneously, such that in use the antenna assembly can communicate with the two communication stations.

This gives the advantage that two antenna beams can be provided simultaneously from a single antenna so that two communication stations can be communicated with at the same time. This could allow a subscriber to receive television broadcasts from two different satellites at the same time. For fixed wireless access system it is sometimes required to switch the subscriber electronically from one base station to another. For example, when a new base station is installed or as the number of subscribers increases. This is easily possible when two antenna beams are provided as in the present system. One antenna beam can be set up for the new communication station or base station.

Preferably the communications antenna assembly further comprises an adjuster arranged to adjust the antenna orientation automatically such that in use a plane of scan of the antenna includes the two directions. This provides the advantage that the system is able to communicate with base stations that move out of the plane of scan, for example satellite communications systems which involve non geo stationary satellites. In this type of situation, a satellite does not stay within "view" of the antenna assembly and it is necessary to "hand over" between satellite base stations quickly in order to maintain an uninterrupted service. With the present system this can be easily effected by adjusting the antenna orientation automatically until the base station directions are in the plane of scan, and then using the beamformer to adjust the antenna beams within the plane of scan.

Preferably the beamformer is arranged to allow the antenna assembly to provide the two antenna beams each at a full gain of the antenna. This provides the advantage that the antenna assembly is able to operate at its full capacity for both base stations.

Preferably the antenna comprises a flat plate antenna array. This provides the advantage that the antenna can be mounted on the side of a building and blends in well with its environment. Also, it is easier to mount and align than a conventional parabolic dish antenna.

The antenna can be mounted on a multi-axis mount, which multi-axis mount has scaled gradations, to enable the antenna to be set-up for use, wherein for a known compass orientation of the mount and inclination to the horizontal, can be configured, given data relating to the desired angular orientation and the desired azimuthal orientation of the antenna.

The invention also encompasses a radio communications system comprising:

(i) a subscriber antenna assembly;

(ii) at least two communication stations at each of two directions from the antenna assembly, said antenna assembly comprising an antenna oriented in use such that a plane of scan of the antenna includes the two directions and wherein the antenna assembly is arranged to substantially simultaneously provide at least two antenna beams, one substantially in each of the communication station directions; and (iii) a subscriber operated device arranged to allow the subscriber to establish a communication link with one of the two communication stations using one of the antenna beams and to transfer this link to the other communication station using the other antenna beam such that in use the subscriber can communicate with either communication station. This provides the advantage that a subscriber can switch between two communication stations when he requires this. For example, the subscriber could receive television signals from one satellite and later switch to a different satellite to receive a different television programme. The subscriber is able to switch between two communication stations in this way by operating a simple, user friendly device.

According to another aspect of the present invention there is provided a radio communications system comprising:

(i) a subscriber antenna assembly;

(ii) at least two communication stations at each of two directions from the antenna assembly, said antenna assembly comprising an antenna oriented in use such that a plane of scan of the antenna includes the two directions and wherein the antenna assembly is arranged to substantially simultaneously provide at least two antenna beams, one substantially in each of the communication station directions; and (iii) a device arranged to establish a communication link with one of the two communication stations using a first one of the antenna beams and to monitor the performance of this link, and wherein the device is further arranged to automatically transfer this link to the other communication station using the other antenna beam in the case that the performance of the first link is reduced. This provides the advantage that if communication with one communication station is degraded, for example, by the presence of summer foliage or the presence of buildings then communication can be established with the other station. This can take place automatically without the need for the subscriber himself to take any action.

The invention also encompasses a radio communications system comprising:

(i) a subscriber antenna assembly;

(ii) at least two communication stations at each of two directions from the antenna assembly, said antenna assembly comprising an antenna oriented in use such that a plane of scan of the antenna includes the two directions and wherein the antenna assembly is arranged to substantially simultaneously provide at least two antenna beams, one substantially in each of the communication station directions; and (iii) a device arranged to establish a communication link with one of the two communication stations using a first one of the antenna beams and simultaneously to establish a communication link with the other communication station using the other antenna beam. This provides the advantage that the subscriber can communicate with two communication stations, such as satellites, simultaneously. For example, the subscriber could video television programmes from one satellite whilst watching television programmes from another satellite.

BRIEF DESCRIPTION OF THE DRAWINGS

In order that the present invention is more fully understood and to show how the same may be carried into effect, reference shall now be made, by way of example only, to the Figures as shown in the accompanying drawing sheets, wherein.

DETAILED DESCRIPTION OF PREFERRED EMBODIMENTS

There will now be described by way of example the best mode contemplated by the inventors for carrying out the invention. In the following description, numerous specific details are set out in order to provide a complete understanding of the present invention. It will be apparent, however, to those skilled in the art that the present invention may be put into practice with variations of the specific.

Figure 1:
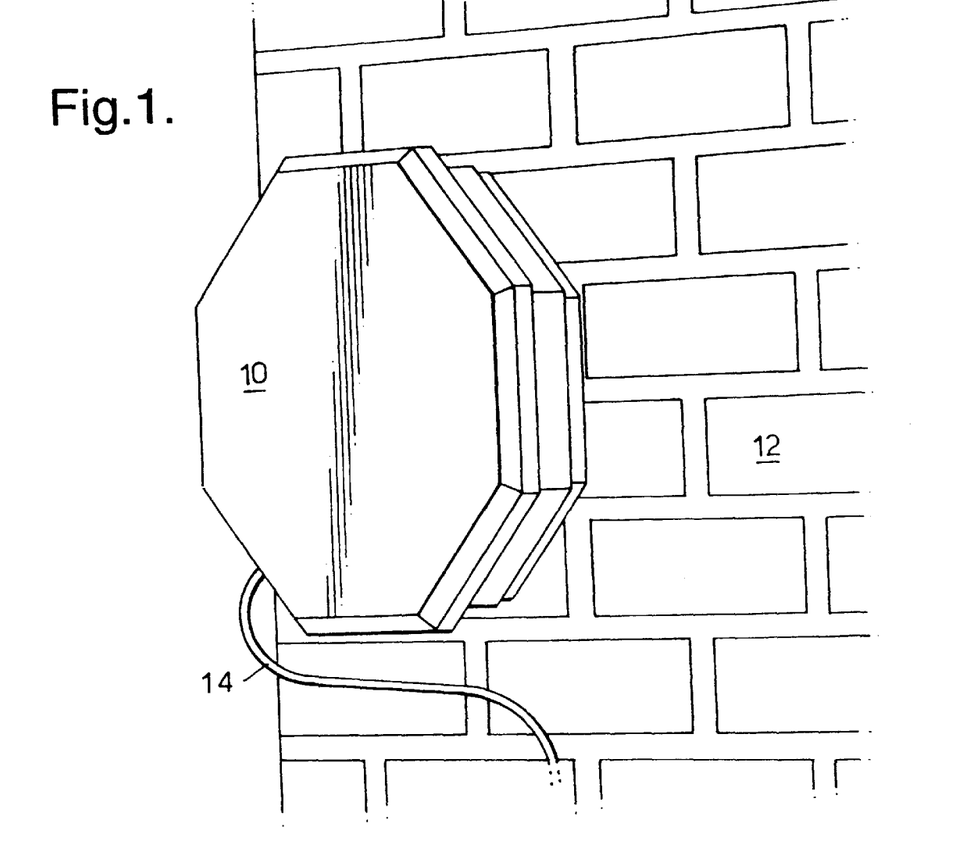
FIG. 1 is a diagramatic perspective view of a typical installation of a wireless local loop antenna assembly.

The integrated antenna assembly 10 shown in FIG. 1 comprises one part of a residential service system for a fixed wireless access arrangement and is mounted on a chimney breast 12 of a house—it is preferably located between fascia board level and 1–2 m above the roof top. In this case, the directional antenna assembly is mounted for use in a fixed wireless access telecommunications environment and is connected via a cable 14 to a junction unit for connection with standard telephone and/or facsimile equipment and a power unit. This type of system can provide many cost and deployment advantages in the provision of telecommunications services in newly developed areas and in rural areas where traditional copper cable systems have not been installed.

Figure 2:
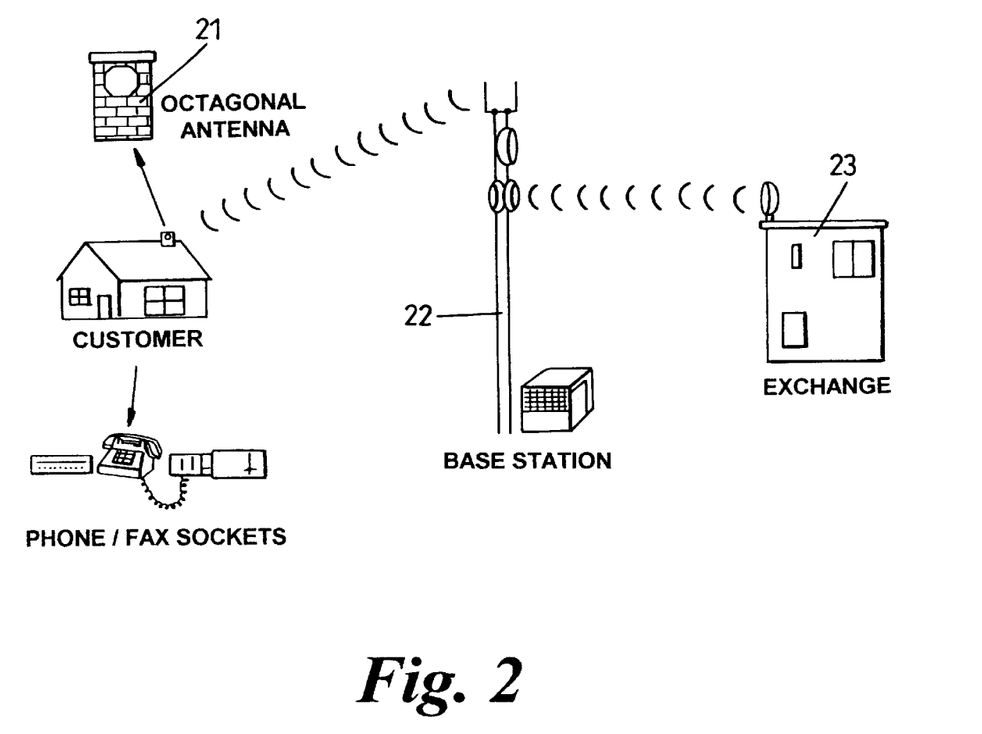
FIG. 2 is a schematic diagram of part of a fixed radio access system.
Figure 3:
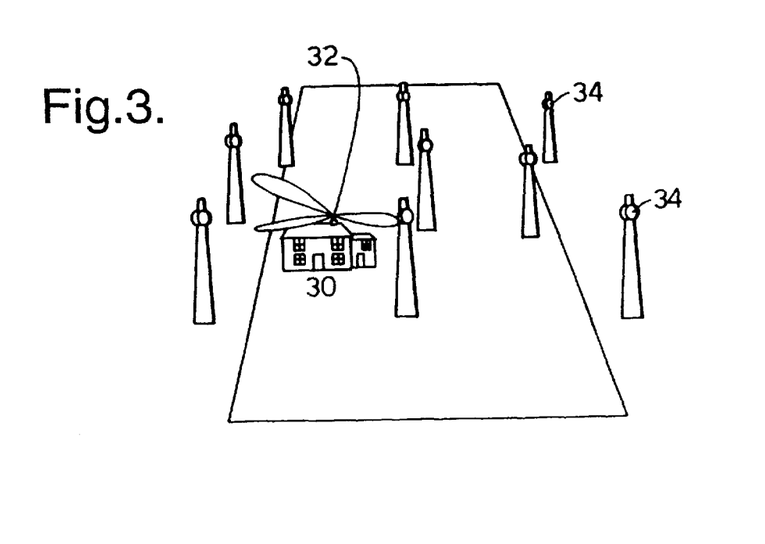
FIG. 3 shows a subscriber antenna assembly deployed in a cellular network.

Referring now to FIG. 2, a directional antenna 21 is directed towards the nearest base station 22. The base station may be a repeater antenna, or any other type of conventional base station. Radio signals are transmitted from the subscriber antenna to the base station and vice versa. The base station 22 is connected in turn to a local exchange 23. With reference to FIG. 3, there is shown a network overview of a simplified fixed wireless access base station network: a subscribers premises 30 has an antenna installation 32 which enables the subscriber unit the choice of communicating with a number of adjacent base stations 34, depending upon the local terrain and disposition of base stations. The best received signal can accordingly be used to determine the orientation of the antenna in subsequent communications. Alternatively, the base station providing the best signal may have reached its system capacity limit and the base station providing the next best signal may be employed. A wide range of services can be delivered to the subscriber using this type of system.

Figure 4A:
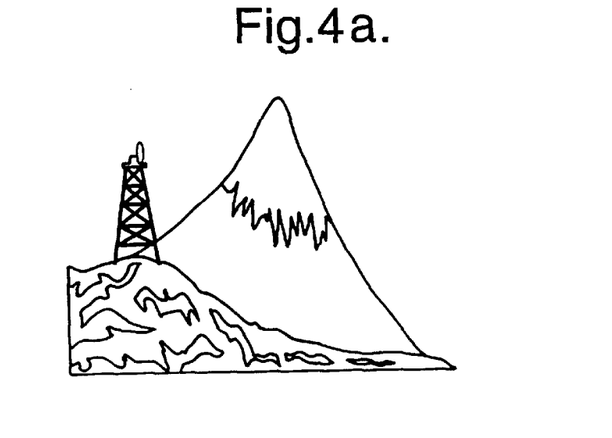
FIGS. 4a and 4b show examples of sources of fading.

Upon installation, the antenna is directed towards the nearest base station. If a building is erected such that it interferes with an optimal link with this base station, then this link may not be sufficiently strong to provide an effective link. At such times the alignment of the antenna would have to be adjusted in a similar fashion as occurred upon the original installation of the antenna whereby the antenna can achieve an optimal link. Since the antenna can communicate with any base station within range, fixed obstructions due to terrain features—see FIG. 4a and terrain clutter such as buildings, trees and the like, can be taken into account during installation. During deployment of base stations an accurate position fix is generally taken either based on maps or a positioning system such as the Global Positioning System (GPS). A record of all base stations (and base station identifiers—Bids) is kept and is retained on a database. Alternative methods are possible.

Figure 4B:
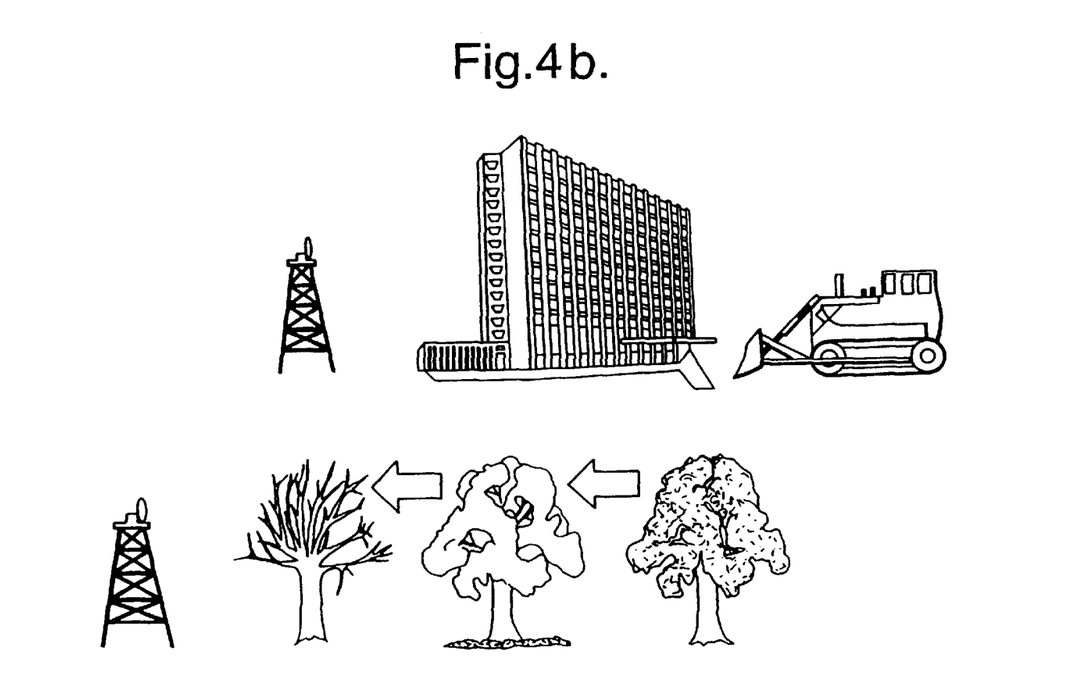

Temporally varying slow fades due to building construction, trees growing and gaining leaves can, however, cause problems. FIG. 4b shows examples of such sources of fading. Further problems would also arise due to increases in the numbers of subscribers and the effects of cell splitting, as a result of the provision of further base stations. Present systems would require that an installation man would need to be deployed to realign subscribers antennas as new base stations are deployed or as temporal fades occur. If the absolute position of a subscribers antenna is known, then the time required for realignment and the overall network maintenance costs are considerably reduced.

Figure 5A:
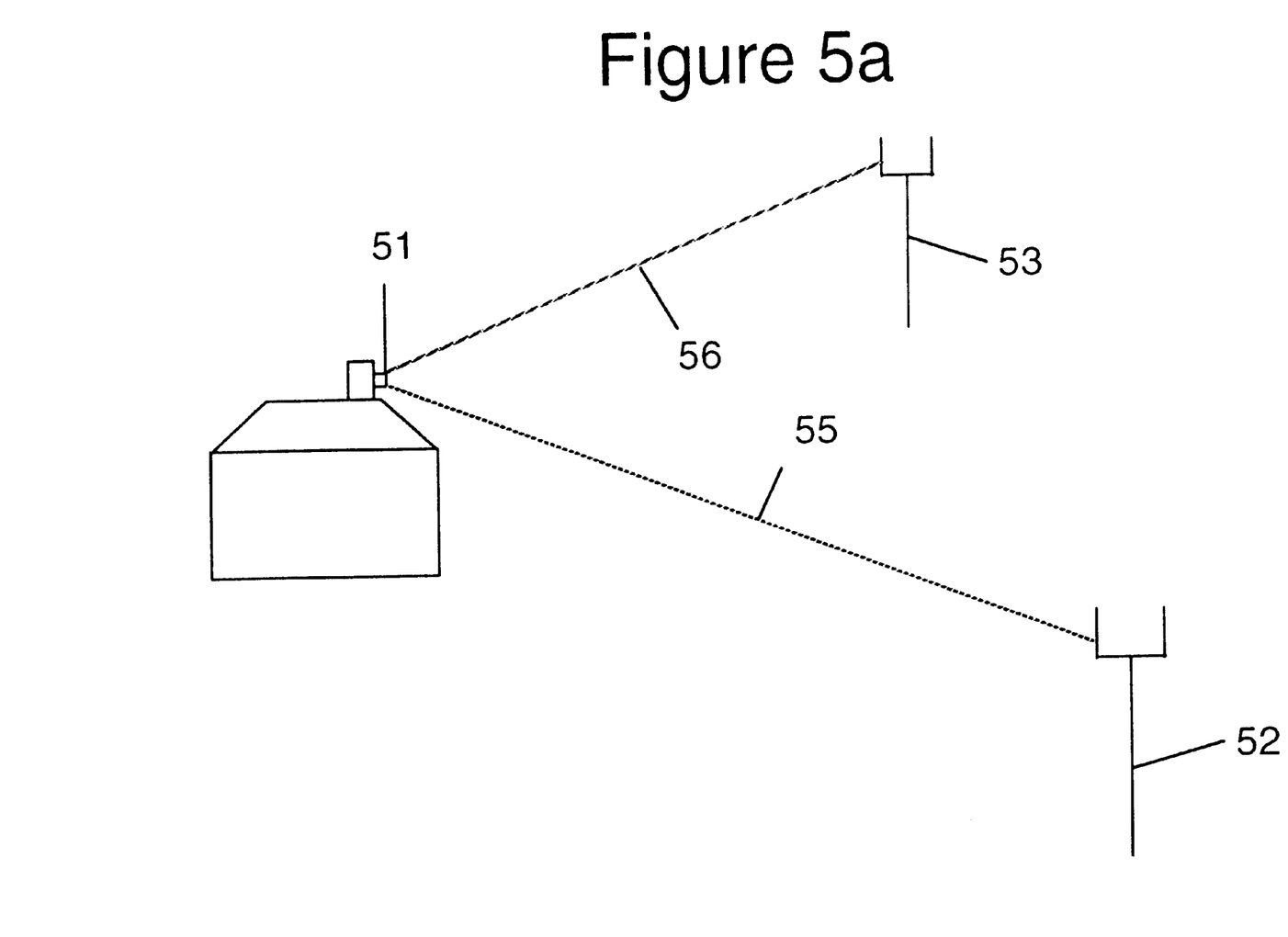
FIG. 5a is a schematic diagram of part of a fixed radio access system with two base stations.

FIG. 5a shows a subscriber antenna assembly 51 mounted onto the chimney of a subscriber's premises. The antenna assembly is shown as part of a communications system which comprises two base stations 52 and 53. For example the communications system may be a fixed wireless access system such as a fixed radio access system (as previously described) and it may also be a satellite communications system. The base stations 52 and 53 may be repeater antennas or any other suitable type of base station. This is done by providing two antenna beams 55, 56 simultaneously, one in each of the base station 52, 53 directions. The subscriber is then able to communicate with the second base station 53 using antenna beam 56. The subscriber is also able to communicate with both base stations 52 53 simultaneously.

The term "communication station" is used to refer to any type of station with which the antenna assembly can communicate and includes transmitters and receivers, conventional base stations, satellites and other suitable types of air borne stations.

Figure 5B:
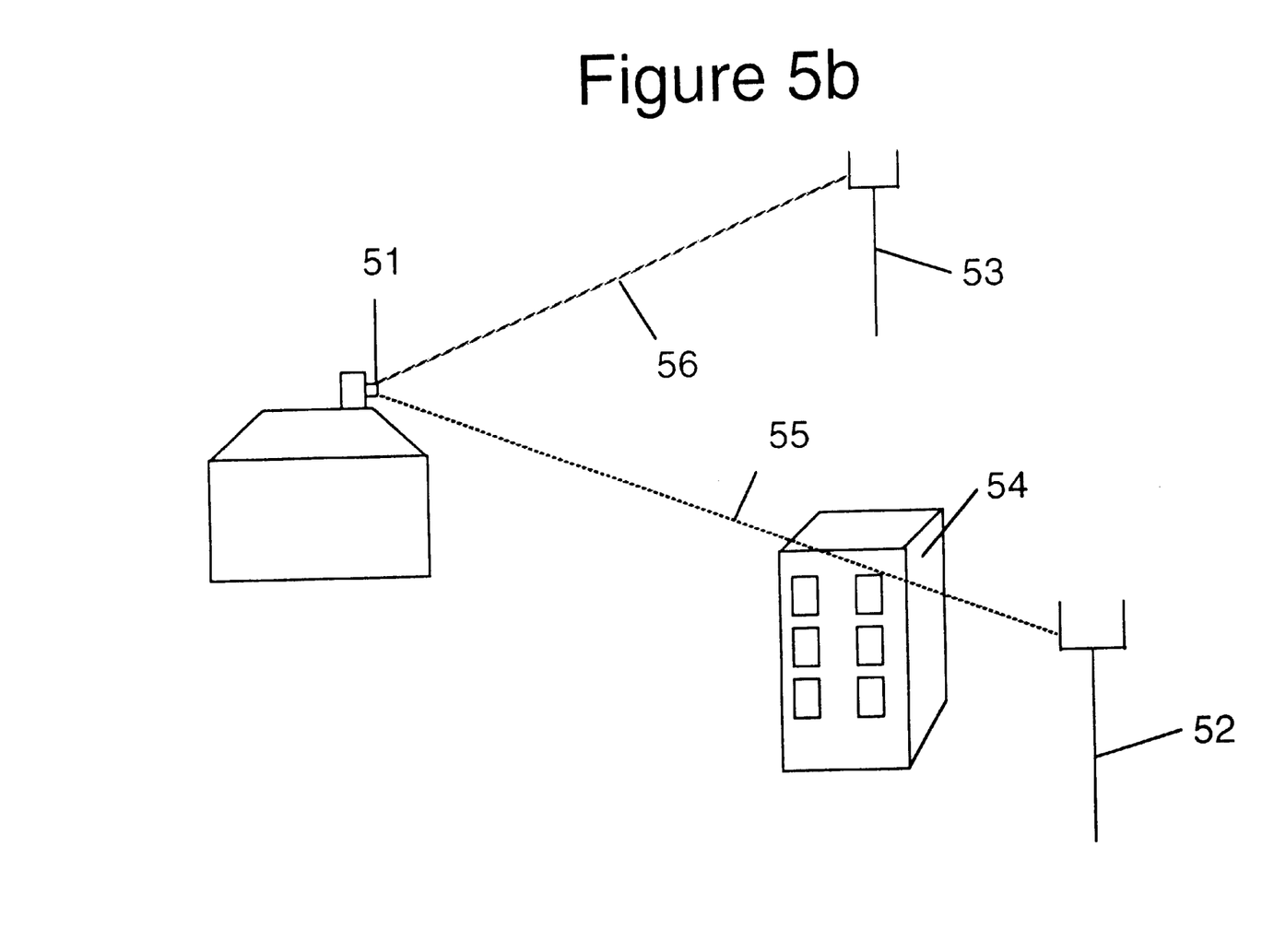
FIG. 5b is a schematic diagram of part of a fixed radio access system with a building between the subscriber antenna and one base station.

In the example shown in FIG. 5b the "line of sight" between the subscriber antenna assembly 51 and base station 52 is blocked by buildings 54 which have recently been erected. An antenna beam 55 which is directed towards base station 52 is thus blocked and it is required to provide another antenna beam from the subscriber antenna assembly to the second base station 53.

The antenna assembly comprises an antenna which is preferably a flat plate array although any other suitable type of antenna may be used. The antenna 51 is orientated so that its plane of scan (the term "plane of scan" is defined below) includes the two base station 52,53 directions. This is either done when the antenna is installed, or the antenna assembly comprises an adjuster which can automatically adjust the antenna orientation so that the plane of scan includes the two directions. The antenna assembly also comprises a beamformer 81 which is connected to the antenna and which enables the antenna assembly to provide two antenna beams simultaneously, each with the full gain of the antenna and both from a single aperture of the antenna. The beamformer also enables the antenna beams to be independently steered within the plane of scan of the antenna. The term "aperture" is used to refer to for example, the area of a flat plate antenna array which contains all the array elements. For a horn antenna the aperture would be the flat front area of the antenna and for an antenna with a reflector the aperture is essentially the area of the reflector surface. The gain of the antenna is proportional to the aperture of the antenna.

In the embodiment where the antenna 51 is oriented so that its plane of scan includes the two base station directions during installation, then the two antenna beams can be independently steered within the plane of scan of the antenna. This type of assembly can be used to switch between base stations that are within the plane of scan. For the embodiment where the antenna assembly comprises an adjuster, the orientation of the antenna 51 can be changed. This type of system can be used for satellite communications systems involving non geo stationary satellites.

The adjuster preferably comprises a multi-axis rotation mount upon which the antenna array is mounted. However, any suitable type of adjuster can be used.

Figure 6:
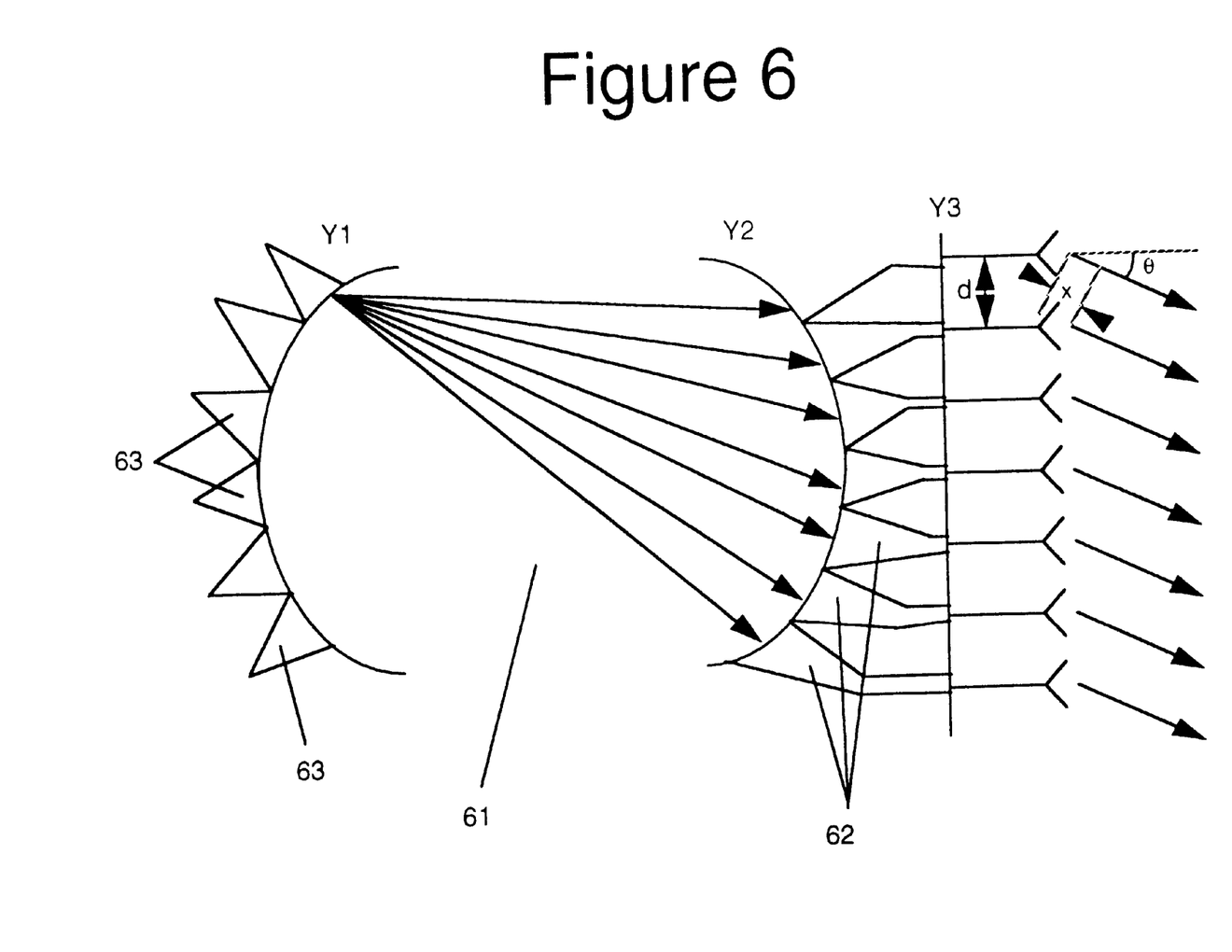
FIG. 6 is a schematic diagram of a Rotman lens.

The beamformer is preferably a Rotman lens beamformer although any other suitable type of beamformer can be used. A Rotman lens is a linear array beamformer which uses variations in path length so that the beam pointing direction does not vary with frequency. FIG. 6 shows a Rotman lens in schematic form. The "lens" consists of a cavity 61 with two sets of ports 62, 63 arranged along facing contours. The array ports 62 are connected to the array elements by transmission lines. The lengths of the transmission lines are a design variable. The beam ports 63 have different positions, corresponding to different beam steering angles. A Rotman lens can be constructed in a number of different ways. For example, a parallel-plate construction can be used which can have either probes or flared-waveguide ports.

Figure 7:
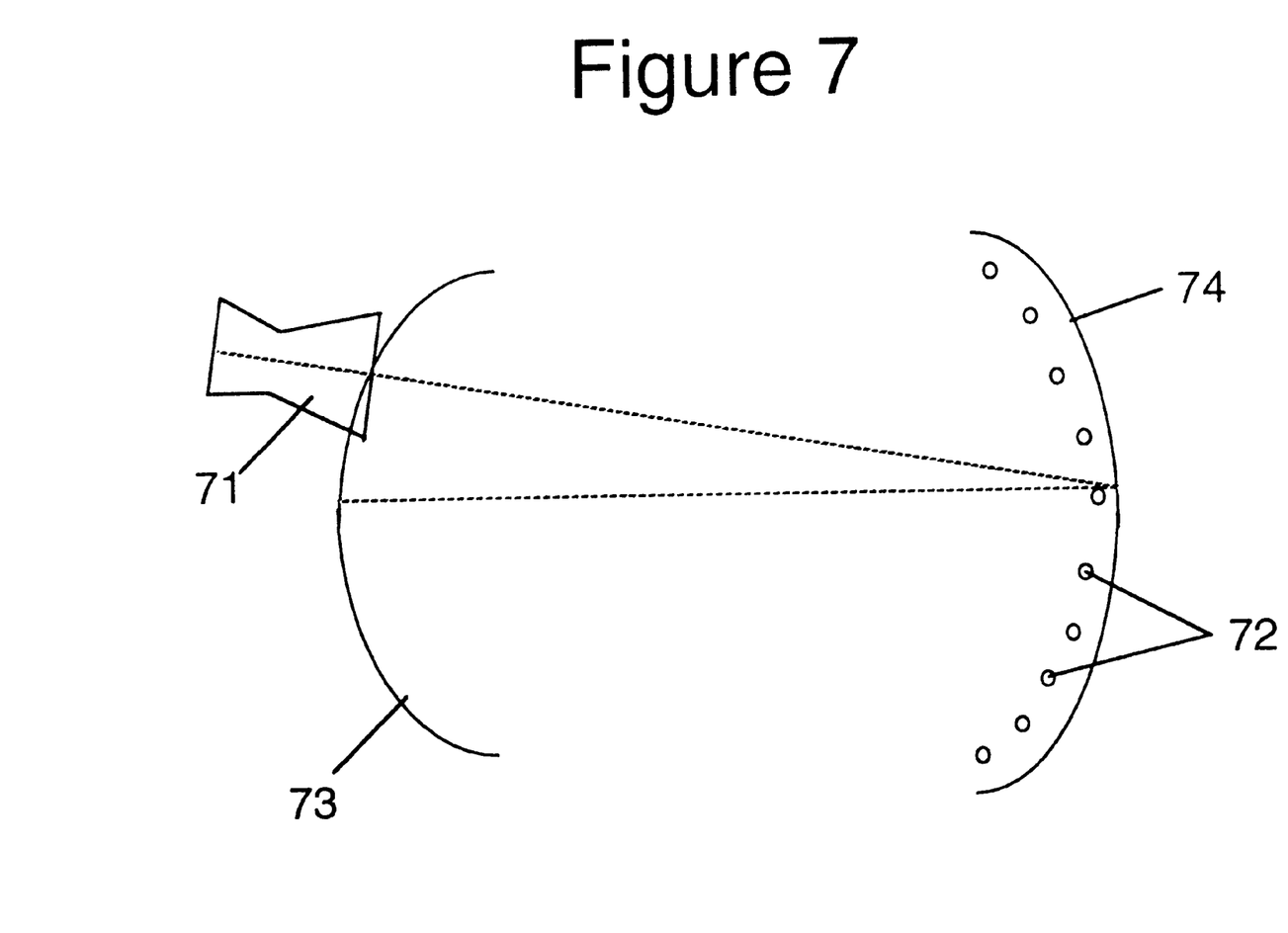
FIG. 7 is a schematic diagram of a Rotman lens with a continuously adjustable beam port and array ports.

FIG. 7 shows a Rotman lens with a continuously adjustable beam port 71 and probe array ports 72. The single beam port is a flared waveguide which is constrained to move along the beam port contour 73 and to point to the middle of the array port contour 74. It is necessary for the lens ports to point in the approximate direction of the centre of the opposite contour to ensure that the contour is correctly illuminated. The array ports are probes which are usually backed by a reflecting metal wall around one quarter wavelength behind the probes. This directs the probe radiation pattern peak normal to the array port contour. A staggered reflecting wall might redirect the pattern but the straightforward approach is to use a g=1/cos α lens design (where α is the angle to the offset focal points and g is a lens parameter which alters the shapes of the array and beam port contours). This is because when g=1/cos α the array port contour is approximately centred on the mid-point of the beam contour.

Figure 8:
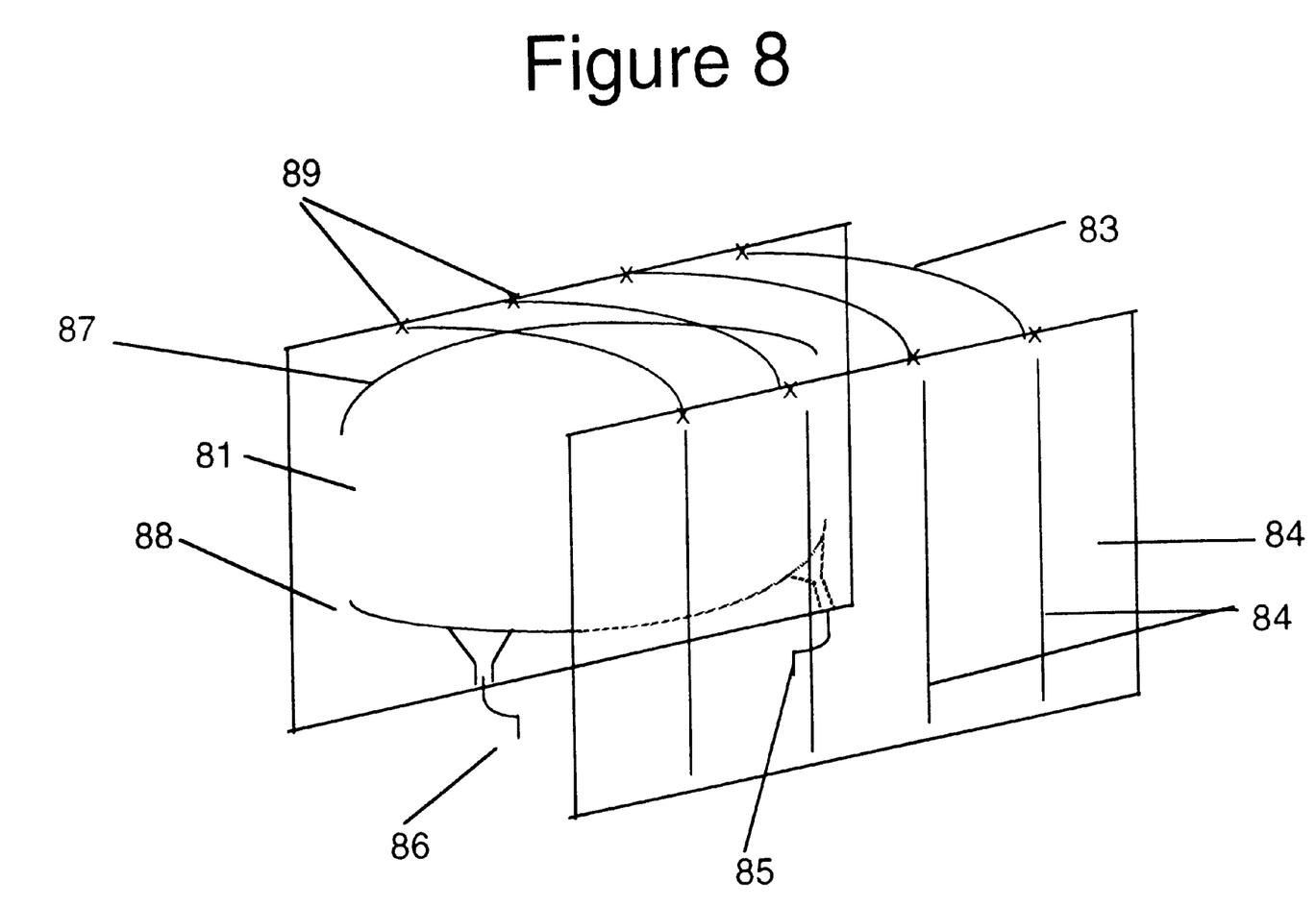
FIG. 8 is a schematic diagram of a Rotman lens linear array beamformer and a flat plate array, which indicates how the flat plate array is fed in columns.

As shown in FIG. 8 the assembly comprises a flat plate array 82 and a Rotman lens beamformer 81 with two beam ports 85, 86. The flat plate array 82 comprises array columns 84 and connections 83 are provided between the array columns and a plurality of array ports 89 to the Rotman lens. The flat plate array 82 and the Rotman lens beamformer 81 are arranged back to back to form a thin planar assembly.

The array 82 is fed in columns, so that the set of columns 84 forms a linear array for beam steering by the Rotman lens beamformer 81. A Rotman lens usually has a set of fixed beam ports 63 arranged along its focal arc 88. Preferably these are replaced as shown in FIG. 8 by two continuously moving beam ports 85, 86. For example, flared waveguide beam ports in a parallel plate Rotman lens (see FIG. 7). These two beam ports 85,86 provide the full gain of the array simultaneously in two directions within the plane of scan. The plane of scan is defined by the array orientation; in the example shown in FIG. 8 the plane of scan is the plane orthogonal to the columns of the array 84. The adjuster preferably comprises a mechanical multi-axis rotation mount and this allows the plane of scan of the array to be aligned to include the two directions of interest (i.e. the directions of the base stations).

If the Rotman lens 81 comprised fixed beam ports and switching took place between these multiple fixed beam ports then this could potentially allow misalignment of one or both beams so that:

a) the full gain of the array would not be realised; and b) interference in other directions could become a problem. By using continuously moveable beam ports these problems are avoided.

Taking into account the desired azimuth and elevational angles, the mount can be adjusted so that the antenna sits in primarily the correct orientation, which will require only small adjustment using, for example, micrometer screws with the use of a peak signal detector for optimum alignment. Redirecting the antenna would be necessary, for example, if the capacity load of the first base station is exceeded, or if it requires maintenance or upgrading, or if as previously discussed, the link with the existing base station becomes unsatisfactory. The use of the multidirectional mounting bracket will be of great benefit in such circumstances, whereby the antenna can be repositioned with respect to the azimuth and elevational gradations.

The performance of present and other presently envisaged wireless local loop or fixed radio access systems will be compromised at high microwave and millimetric frequencies due to the effects of slow temporal fading. At such high frequencies, diffraction into shadowed regions becomes less significant and therefore very high transmit powers are required to penetrate shadowed regions. As such, the use of high frequencies is untenable. In contrast, the present invention allows a subscriber to use flexibly any one of a number of base stations which is within range.

In the case of a particular base station being at its capacity limit and for traffic reasons the new antenna should not be connected to such a base station, then that base station could provide an amended broadcast control message to prevent attachment to them.

A controller which is arranged to determine the position of the most proximate base stations, or for example, future positions of satellites, is provided. This uses information from the database which may be remote. The controller itself may be remote in which case communication is provided for between the remote computer/controller, the data base and the antenna assembly (e.g. a mobile 'phone or even using the fixed wireless access system itself). The controller can be a microprocessor or simply a look up table. It can be located in the receiver itself. Any conventional type of controller can be used.

For earth orbiting satellite systems such as LEO and MEO systems, the satellites can orbit the earth in orbits that are substantially around lines of longitude. Several satellites are provided in each orbit. For example there may be four satellites in a particular orbit, with two of these in "sight" of the antenna assembly at any one time. As the earth rotates satellites within a given orbit "go out of view" so that it is necessary to "switch" to satellites in another orbit. This gives two "hand over" situations for non geo stationary satellites, one between satellites in the same orbit and one between satellites in different orbits. The future positions of the satellites are known from information provided in the database and instructions given by the controller.

The situation when the antenna assembly is in communication with a first earth orbiting satellite (using a first antenna beam) and it needs to "hand over" to a second satellite as the first satellite goes out of view is now described. This situation can be for switching between satellites in the same orbit and for satellites in different orbits. The plane of scan of the antenna is adjusted in order that the direction of the second satellite at the "hand over" point is included in the plane of scan as well as the direction of the first satellite. Then using the continuously moveable beam ports of the beamformer, a second antenna beam is directed so that it is able to communicate with the second satellite, whilst the first antenna beam is still enabling communication between the antenna assembly and the first satellite. Once communication is established with both satellites simultaneously, then hand over can take place i.e. the signals from the first satellite are "ignored" and the signals from the second satellite are used. This enables a smooth hand over to take place, without any interruption in the service provided to the subscriber. For this earth orbiting satellite application, continuously moveable beam ports are required in the beamformer. However, for geo-stationary satellites, or other fixed communication stations this is not essential. Fixed beam ports could be used. In this case, the directions of the antenna beams are adjusted during installation of the antenna, to the required directions.

A range of applications are within the scope of the invention. These include situations in which it is requried to provide two independently steerable antenna beams from a single aperture antenna. For example, in fixed wireless access systems and satellite communications systems including earth orbiting satellite systems.

I claim:

1. A communications antenna assembly operable to communicate with at least one of two communication stations at each of two directions from the antenna assembly, said assembly comprising:
   (i) a single antenna oriented in use such that a plane of scan of the antenna includes the two directions;
   (ii) a beamformer connected to the antenna and arranged to allow the antenna to provide at least two antenna beams, one substantially in each of the communication station directions, and wherein the antenna beams are provided substantially simultaneously, such that in use the antenna assembly can communicate with the two communication stations, wherein the beamformer is arranged to allow the antenna assembly to provide the two antenna beams each at a full gain of the antenna.

2. A communications antenna assembly as claimed in claim 1 which further comprises an adjuster arranged to adjust the antenna orientation automatically such that in use a plane of scan of the antenna includes the two directions.

3. A communications antenna assembly as claimed in claim 1 wherein the single antenna comprises an antenna array.

4. A communications antenna assembly as claimed in claim 1 wherein the single antenna comprises a flat plate antenna array.

5. A communications antenna assembly as claimed in claim 1 wherein the beamformer is arranged to allow the antenna assembly to provide the two antenna beams from a single aperture of the antenna.

6. A communications antenna assembly as claimed in claim 2 wherein the adjuster comprises a multi-axis rotation mount arranged to allow the assembly to be mounted onto it.

7. A communications antenna assembly as claimed in claim 1 wherein the beamformer comprises a linear array beamformer.

8. A communications antenna assembly as claimed in claim 1 wherein the beamformer comprises a lens beamformer.

9. A communications antenna assembly as claimed in claim 1 wherein the beamformer comprises a Rotman lens beamformer.

10. A communications antenna assembly as claimed in claim 1 wherein the beamformer comprises a parallel plate Rotman lens with a pair of substantially continuously moveable beam ports.

11. A communications antenna assembly as claimed in claim 1 wherein the beam ports comprise flared waveguides.

12. A communications antenna assembly as claimed in claim 1 wherein the antenna and the beamformer are arranged back to back to form a planar assembly.

13. A communications antenna assembly as claimed in claim 1 wherein the antenna comprises an antenna array which further comprises a number of columns and wherein a connection is provided between each column and the beamformer.

14. A method of operating a communications antenna assembly to communicate with at least one of two communication stations at each of two directions from the antenna assembly, said method comprising the steps of:
   (i) orienting a single antenna included in the antenna assembly such that in use, a plane of scan of the antenna includes the two directions; and
   (ii) providing at least two antenna beams, one substantially in each of the base station directions, and providing said beams substantially simultaneously, such that in use the antenna assembly can communication with the two communication stations, wherein the beamformer is arranged to allow the antenna assembly to provide the two antenna beams each at a full gain of the antenna.

15. A method of operating a communications antenna assembly as claimed in claim 14 wherein said step (i) is automated.

16. A method of operating a communications antenna assembly as claimed in claim 14 wherein said step (ii) further comprises providing the two antenna beams each at a full gain of the antenna.

17. A method of operating a communications antenna assembly as claimed in claim 14 wherein said step (ii) further comprises providing the two antenna beams from a single aperture of the antenna.

18. A radio communication system comprising:
   (i) a subscriber antenna assembly;
   (ii) at least two communication stations at each of two directions from the antenna assembly, said antenna assembly comprising a single antenna oriented in use such that a plane of scan of the antenna includes the two directions and wherein the antenna assembly is arranged to substantially simultaneously provide at least two antenna beams, one substantially in each of the communication station directions; and
   (iii) a subscriber operated device arranged to allow the subscriber to establish a communication link with one of the two communication stations using one of the antenna beams and to transfer this link to the other communications station using the other antenna beam such that in use the subscriber can communicate with either communication station, wherein the beamformer is arranged to allow the antenna assembly to provide the two antenna beams each at a full gain of the antenna.

19. A radio communication system comprising:

(i) a subscriber antenna assembly;

(ii) at least two communication stations at each of two directions from the antenna assembly, said antenna assembly comprising a single antenna oriented in use such that a plane of scan of the antenna includes the two directions and wherein the antenna assembly is arranged to substantially simultaneously provide at least two antenna beams, wherein the beamformer is arranged to allow the antenna assembly to provide the two antenna beams each at a full gain of the antenna; and (iii) a device arranged to establish a communication link with one of the two communication stations using a first one of the antenna beams and to monitor the performance of this link, and wherein the device is further arranged to automatically transfer this link to the other communication station using the other antenna beam in the case that the performance of the first link is reduced.

20. A radio communication system comprising:

(i) a subscriber antenna assembly;

(ii) at least two communication stations at each of two directions from the antenna assembly, said antenna assembly comprising a single antenna oriented in use such that a plane of scan of the antenna includes the two directions and wherein the antenna assembly is arranged to substantially simultaneously provide at least two antenna beams, wherein the beamformer is arranged to allow the antenna assembly to provide the two antenna beams each at a full gain of the antenna; and (iii) a device arranged to establish a communication link with one of the two communication stations using a first one of the antenna beams and simultaneously to establish a communication link with the other communication station using the other antenna beam.

* * * * *